3,169,121
CARBONATE-CARBOXYLATE COPOLYESTERS OF DIHYDRIC PHENOLS AND DIFUNCTIONAL CARBOXYLIC ACIDS
Eugene P. Goldberg, Pittsfield, Mass., assignor to General Electric Company, a corporation of New York
No Drawing. Filed Aug. 22, 1957, Ser. No. 679,743
18 Claims. (Cl. 260—47)

This invention relates to linear copolyesters. More specifically, this invention relates to linear copolyesters containing both carbonate groups and carboxylate groups in the linear chain.

Many carbonate resins are known. Among these carbonate resins are those prepared by the vinyl polymerization of unsaturated carbonate esters, such as allyl carbonates, etc., those resins prepared from the ester interchange of carbonate esters with aliphatic glycols, and resins prepared by reacting dihydroxy monoaryl compounds such as hydroquinone and resorcinol, with carbonate precursors, such as phosgene or carbonate esters. Although these known carbonates have found some use as modifiers, plasticizers, hydraulic fluids and so forth, they have never achieved industrial importance as individual thermoplastic entities, because of their poor properties. For example, they are too low melting, too insoluble, or too unstable.

In copending application S.N. 520,166, filed July 5, 1955, now U.S. Patent 3,153,008, and assigned to the same assignee as the present invention, there is disclosed a new class of aromatic polycarbonate resins which overcomes many of the shortcomings of the above-described carbonate polymers. These carbonate resins are characterized by recurring carbonate groups and aromatic groups, the carbonate groups being bonded directly to a ring carbon atom of an aromatic group. They are prepared by reacting a dihydroxy diaryl compound and a carbonate precursor. In particular, the polymers disclosed in the aforementioned application are characterized by high melting points and excellent thermal-oxidative stability.

I have now discovered a new class of resins comprising both carbonate and carboxylate groups in their linear chain possessing properties not obtainable in other polycarbonate resins. More specifically, the copolymer compositions of the present invention, although possessing a wide range of desirable properties, are particularly outstanding in their high temperature strength properties, moldability and improved solvent resistance. This invention also enables, through the proper selection of reactants, the attainment of greater crystallinity, higher melting points and higher heat distortion temperatures than were heretofore possible with polycarbonate resins.

Briefly stated, the copolyesters of this invention comprise recurring carbonate groups

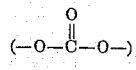

carboxylate groups

and aromatic carbocyclic groups in the linear polymer chain, in which at least some of the carboxylate groups and at least some of the carbonate groups are bonded directly to ring carbon atoms of the aromatic carbocyclic groups. The copolyesters are prepared by reacting, as essential ingredients, a difunctional carboxylic acid, a dihydric phenol and a carbonate precursor. The preferred method of preparing the copolyesters of the present invention is disclosed in greater detail in my copending application, S.N. 679,747, assigned to the same assignee as the present invention and filed concurrently herewith, now U.S. Patent 3,030,331. However, both this method and other methods more fully described hereinafter can be utilized for the preparation of the copolyesters.

THE DIHYDRIC PHENOLS

The dihydric phenols useful in the present invention will in general conform to the formula I
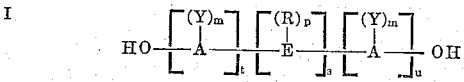

in which A is an aromatic group such as phenylene, biphenylene, naphthylene, anthrylene, etc. E may be an alkylene or alkylidene group such as methylene, ethylene, propylene, propylidene, isopropylidene, butylene, butylidene, isobutylidene, amylene, isoamylene, amylidene, isoamylidene, etc. Where E is an alkylene or alkylidene group, it may also consist of two or more alkylene or alkylidene groups, connected by a non-alkylene or non-alkylidene group such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group (e.g. cyclopentyl, cyclohexyl), a sulfur-containing linkage, such as sulfide, sulfoxide or sulfone; an ether linkage; a carbonyl group; a tertiary nitrogen group, or a silicon-containing linkage such as silane or siloxy. Other groups which E may represent will occur to those skilled in the art. R is hydrogen or a monovalent hydrocarbon group such as alkyl (methyl, ethyl, propyl, etc.), aryl (phenyl, naphthyl, etc.), aralkyl (benzyl, ethylphenyl, etc.) or cycloaliphatic (cyclopentyl, cyclohexyl, etc.). Y may be an inorganic atom such as chlorine, bromine, fluorine, etc.; an inorganic group such as the nitro group, etc.; an organic group such as R above, or an oxy group such as OR, it being only necessary that Y be inert to and unaffected by the reactants and the reaction conditions. The letter $m$ is any whole number from and including zero through the number of positions on A available for substitution; $p$ is any whole number from and including zero through the number of available positions on E; $t$ is a whole number equal to at least one, $s$ is either zero or one, and $u$ is any whole number including zero.

In the dihydric phenol compound represented by Formula I above, when more than one Y substituent is present, they may be the same or different. The same is true for the R substituent. Where $s$ is zero in Formula I and $u$ is not zero, the aromatic rings are directly joined with no intervening alkylene or other bridge. The positions of the hydroxyl groups and Y on the aromatic nuclear residues A can be varied in the ortho, meta, or para positions and the groupings can be in a vicinal, asymmetrical or symmetrical relationship, where two or more ring carbon atoms of the aromatic hydrocarbon residue are substituted with Y and hydroxyl group.

Examples of dihydric phenol compounds that may be employed in this invention include 2,2-bis-(4-hydroxyphenyl)-propane (bisphenol-A);
2,4'-dihydroxydiphenylmethane;
bis-(2-hydroxyphenyl)-methane;
bis-(4-hydroxyphenyl-methane;
bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,2-bis-(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;

2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-propane;
2,2-bis-(4-hydroxyphenyl)-1-phenylpropane;

and the like. Also included are dihydroxybenzenes typified by hydroquinone and resorcinol, dihydroxydiphenyls such as 4,4'-dihydroxydiphenyl; 2,2'-dihydroxydiphenyl; 2,4'-dihydroxydiphenyl; dihydroxy-naphthalenes such as 2,6-dihydroxynaphthalene, etc.

Examples of dihydric phenols wherein E is a sulfur containing radical are the dihydroxy aryl sulfones set forth in my copending application S.N. 613,817, filed October 4, 1956 and assigned to the same assignee as this invention. Illustrative of compositions there set forth are bis - (4 - hydroxyphenyl) - sulfone; 2,4' - dihydroxydiphenyl sulfone; 5'-chloro-2,4'-dihydroxydiphenyl sulfone; 5'-chloro-2,4'-dihydroxydiphenyl sulfone; 3'-chloro-4,4'-dihydroxydiphenyl sulfone; 4,4'-dihydroxytriphenyl disulfone, etc. The preparation of these and other useful sulfones is described in Patent 2,288,282—Huissmann. Polysulfones as well as substituted sulfones using halogen, nitrogen, alkyl radicals etc. are also useful.

Dihydroxy aromatic ethers such as those set forth in copending application S.N. 598,768, filed July 19, 1956 and assigned to the same assignee as this invention, now U.S. Patent 3,148,172, are also useful. Methods of preparing such materials are found in "Chemical Reviews" 38, 414–417 (1946) and Patent 2,739,171—Linn. Exemplary of such dihydroxy aromatic ethers are 4,4'-dihydroxydiphenyl ether;
4,4'-dihydroxytriphenyl ether;
the 4,3'-, 4,2'-, 4,1'-, 2,2'-, 2,3'-, etc. dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,2'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxy-diphenyl ether, etc.

Mixtures of the dihydric phenols can also be employed and where dihydric phenol is mentioned herein, mixtures of such materials are considered to be included.

THE CARBOXYLIC ACIDS

In general, any difunctional carboxylic acid conventionally used in the preparation of linear polyesters may be used for the preparation of the copolyesters of the present invention. In general the caboxylic acids which are useful are aliphatic carboxylic acids, aliphatic-aromatic carboxylic acids or aromatic carboxylic acids.

The acids which are useful will generally conform to the formula

II 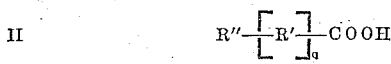

in which R' is an alkylene, alkylidene or cycloaliphatic group in the same manner as set out above for E in Formula I; an alkylene, alkylidene or cycloaliphatic group containing ethylenic unsaturation; an aromatic radical such as phenylene, naphthylene, biphenylene, substituted phenylene, etc.; two or more aromatic groups connected through non-aromatic linkages such as those defined by E in Formula I; an aralkyl radical such as tolylene, xylyene, etc. R" is either a carboxyl or a hydroxyl group. $q$ is one where R" is a hydroxyl group and either zero or one where R" is a carboxyl group. Thus the dicarboxylic acid will either be a monohydroxy monocarboxylic acid or a dicarboxylic acid.

Included within the scope of this invention are the saturated, aliphatic dibasic acids derived from straight chain paraffin hydrocarbons, such as oxalic, malonic, dimethyl malonic, succinic, glutaric, adipic, pimelic, suberic, azelaic and sebacic acid. Also included are the halogensubstituted aliphatic dibasic acids. Aliphatic carboxylic acids containing hetero atoms in their aliphatic chain, such as thio-diglycollic or diglycollic acid may also be used. Also useful are such unsaturated acids as maleic or fumaric.

Suitable examples of aromatic and aliphatic-aromatic dicarboxylic acids which may be used are phthalic, isophthalic, terephthalic, homophthalic, o-, m-, and p-phenylenediacetic acid; the polynuclear aromatic acids such as diphenic acid, and 1,4 naphthalic acid.

Examples of hydroxy acids are the aliphatic hydroxy acids such as hydroxybutyric acid, glycollic acid, and lactic acid. Examples of aromatic and aliphatic-aromatic hydroxy acids are mandelic acid, p-, m- and o-hydroxy benzoic acid. The hydroxy-substituted long-chain fatty acids, such as 12-hydroxystearic acid may also be used. Cycloaliphatic acids including tetrahydrophthalic, tetrahydroterephthalic tetrahydroisophthalic, 3,6-endomethylenetetrahydrophthalic acid (also known as Carbic or Nadic acid), hexachloro-3,6-endomethylenetetrahydrophthalic acid (also known as Chlorendic acid) or camphoric acid may also be used.

Other useful acids are the polymerized fatty acids as, for example, those sold under the trade name "Empol" by the Emery Company, one example of which is Empol 3079–S, which is a linoleic acid dimer containing two carboxyl groups per molecule. Mixtures of the carboxylic acids can also be employed and where carboxylic acid is mentioned herein, mixtures of such materials are considered to be included.

PREPARATION OF COPOLYESTERS

The particular method by which the copolyesters are prepared will depend upon the type of polyester desired. Random copolymers, in which the structural units are propagated along the copolymer chain in a random fashion, may be prepared by conventional esterification methods. Thus, a difunctional acid may be reacted with the dihydric phenol and, as the carbonate precursor, a diaryl carbonate. If desired, the ester of the difunctional acid may be reacted with the dihydric phenol and the diaryl carbonate under ester exchange reaction conditions. A preferred method, however, is that described in my above mentioned copending application S.N. 679,747, now U.S. Patent 3,030,331, and involves the direct reaction of the acid, the phenol and a carbonyl halide such as phosgene in an organic solution containing a base such as pyridine. When this procedure is employed it is desirable to avoid the use of alpha, beta unsaturated acids. Other methods for preparing copolyesters involving the use of acid halides or anhydrides may be employed but they are generally less useful than the foregoing.

Copolyesters of tailored structure include block copolymers in which at least one of the structural units is itself polymeric. Although block copolymers may be prepared by melt blending of different homopolymers, themselves prepared by ester exchange melt polymerization, this method requires very careful control of reaction conditions to insure coreaction without ester equilibration to a random copolymer. The acid-phenol-carbonyl halide reaction is also the preferred method for the preparation of block copolymers. In this method of preparation, various tailored copolyesters may be prepared by properly ordering the addition of reactants. Thus block copolymers may be prepared, for example by adding phosgene initially to the dihydric phenol following by addition of acid and additional phosgene, or alternatively by adding phosgene initially to a dihydric phenol-dibasic acid mixture followed by addition of more dihydric phenol and phosgene. Similarly, block structures may be prepared as, for example, by the mixing of a dihydric phenol-phosgene reaction product and a dihydric phenol-acid-phosgene reaction product followed by further addition of phosgene to the mixture.

The tailored structures may also be prepared by first preparing esters of the acid and dihydric phenol by conventional esterification techniques and then adding phosgene.

As stated above, the preferred method of preparation of the present copolymers involves the reaction of a carbonyl halide such as phosgene or bromophosgene, with a dihydric phenol and a difunctional carboxylic acid. The proportion of carboxylate and carbonate groups present in the final polymer can be suitably varied by varying the molar ratio of dihydric phenol to difunctional acid. Where a dicarboxylic acid is used, it is preferable that this molar ratio of phenol to acid be more than one. Because of the presence of the hydroxyl group in hydroxy acids, this preferred molar ratio does not apply in the case of hydroxy acid copolymers and virtually any ratio of dihydric phenol to hydroxy acid may be conveniently utilized.

The copolyester of the present invention will comprise at least two of the following four recurring units in their linear chain:

III 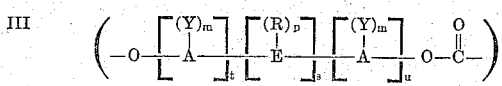

where the letters have the meaning given above in Formula I,

IV 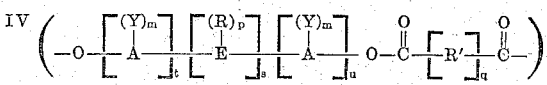

where the letters have the meaning given above in Formulae I and II,

V 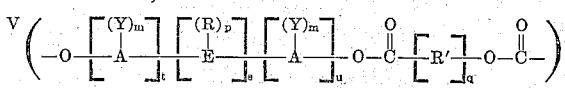

where the letters have the meaning given above in Formulae I and II, and

VI 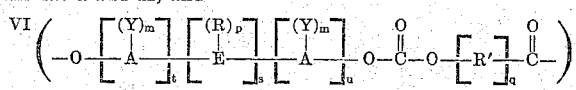

where the letters have the meaning given above in Formulae I and II.

Where the difunctional acid used is a dicarboxylic acid, the copolyester will comprise recurring carbocyclic aromatic carbonate units of the type illustrated by Formula III and carbocyclic aromatic carboxylate units of the type illustrated by Formula IV above. Where the difunctional acid is a hydroxy acid, the recurring units will be those of Formulae III, V and VI. Where both hydroxy and dicarboxylic acids are used, the copolyester will contain units of Formulae III, IV, V and VI. The copolyesters of this invention will contain at least one of the units shown by Formula III and at least one of the units shown by Formula IV or V and VI and may contain as many as 500 or more of each of the foregoing units.

It will be noted from the above Formulae III, IV, V and VI that at least some of the carbonate groups and at least some of the carboxylate groups will always be bonded directly to a ring carbon atom of an aromatic group. In the copolyesters containing the units of Formulae III and IV, the carbonate and carboxylate groups will always be bonded to aromatic ring carbon atoms. Where the copolyester contains units shown by Formulae V and VI some of the carbonate groups may be formed from the hydroxyl function of the difunctional acid and may therefore separate two non-aromatic groups. Similarly, where units of Formulae V and VI are present, some of the carboxylate functions may be formed from the hydroxyl function of the hydroxy acid and therefore separate two non-aromatic groups.

In order that those skilled in the art may better understand how the present invention may be practiced, the following examples are given by way of illustration. Intrinsic viscosities were measured in dioxane at 30.3° C. Tensile strengths were determined using cast or compression molded test specimens at a draw speed of 2" per minute on an Instron tester. Flexural strengths were determined on a Dynstat tester. The impact strength of the materials was measured on a Dynstat Impact Tester using transfer molded ⅛" x ⅜" x ⅝" specimens, a C weight being used and the values being scale B readings. The heat distortion temperature was measured by a modified ASTM test using ⅛" x ⅜" x ⅝" specimens and a 2½ kilogram weight.

*Example 1*

This example illustrates the preparation of a copolymer having recurring carbonate and adipate linkages, prepared by reacting phosgene, adipyl chloride and bisphenol-A.

To a one-liter flask equipped with stirrer, thermometer and gas inlet tube was added 0.18 mol (41.2 grams) of bisphenol-A and 470 cc. of pyridine. Adipyl chloride, 0.085 mol (15.6 grams) was added to the bisphenol-A-pyridine solution dropwise over a period of 22 minutes and stirred an additional 36 minutes. Phosgene, 0.19 mol, was then bubbled into the reaction mixture at a rate of 0.4 to 0.5 gram per minute at 26–32° C. until the mixture became viscous. The polymer was then precipitated in a blender with about 4 volumes of isopropanol, followed by three washes with isopropanol, in the blender. The polymer was then dried at 80° C. for 16 hours and was soluble in dioxane and methylene chloride. It possessed the following properties.

Intrinsic viscosity _____ 0.66
Softening temperature (° C.) _____ 155–190
Tensile strength (p.s.i., 25° C.):
    Ultimate _____ 8250
    Elongation (percent) _____ 10

Examples 2 through 17 are illustrative of the preparation of random copolymers. In each of these examples, phosgene was bubbled into a stirred pyridine solution (470 cc. pyridine) of a difunctional acid and a dihydric phenol maintained at 25–35° C. Phosgene was added until the reaction mixture became viscous. The reaction equipment and method of isolating and purifying the polymer were as in Example 1.

*Example 2*

The following reactants were used:

Bisphenol-A _____, 0.18 mol (41.2 grams).
Adipic acid _____ 0.085 mol (12.4 grams).
Phosgene _____ Ca. 0.34 mol (33.7 grams).

The properties of the copolymer were as follows:
Intrinsic viscosity _____ 1.1
Softening temperature (° C.) _____ 140–230

A film of the above copolymer cast from chloroform solution was clear, tough and flexible and had the following properties.

Tensile strength (p.s.i.):

|  | 25° C. | 80° C. |
|---|---|---|
| Yield | 7,580 | 4,030 |
| Ultimate | 6,040 | 3,730 |
| Elongation (percent) | 42 | 133 |

Example 3

The following reactants were used:

Bisphenol-A _____ 0.17 mol (38.8 grams).
Isophthalic acid _____ 0.085 mol (14.1 grams).
Phosgene _____ Ca. 0.33 mol (32.7 grams).

The properties of the resulting polymer were as follows.

Intrinsic viscosity _____ 0.93
Softening temperature (° C.) _____ 225–255
Tensile strength (p.s.i.):

|  | 25° C. | 80° C. | 120° C. | 140° C. |
|---|---|---|---|---|
| Yield | 9,100 | 5,970 | 3,300 | 1,010 |
| Ultimate | 7,360 | 5,600 | 2,500 | 1,240 |
| Elongation (percent) | 32 | 113 | 156 | 143 |

Transfer molding temperature (° C.) _____ 230
Heat distortion (° C.) _____ 177
Impact strength _____ 15.5
Wt. loss (percent at 24 hrs., 230° C.) _____ 1.5
Flexural strength (p.s.i.) _____ 16,200
Stiffness (cm. kg./°) _____ 1.75

Example 4

The following reactants were used:

Bisphenol-A _____ 0.17 mol (38.8 grams).
Azelaic acid _____ 0.085 mol (16.0 grams).
Phosgene _____ Ca. 0.30 mol (29.7 grams).

The properties of the resulting polymer were as follows.

Intrinsic viscosity _____ 0.88
Softening temperature (° C.) _____ 125–185
Tensile strength (p.s.i.):

|  | 25° C. | 80° C. |
|---|---|---|
| Yield | 6,350 | 670 |
| Ultimate | 5,300 | 2,660 |
| Elongation (percent) | 120 | 176 |

Example 5

The following reactants were used:

Bisphenol–A _____ 0.17 mol (38.8 grams).
Terephthalic acid _____ 0.085 mol (14.1 grams).
Phosgene _____ Ca. 0.26 mol (25.7 grams).

The properties of the resulting polymer were as follows.

Intrinsic viscosity _____ 0.96
Softening temperature (° C.) _____ 315–365
Tensile strength (p.s.i.):

|  | 25° C. | 120° C. | 140° C. |
|---|---|---|---|
| Yield |  | 3,880 | 2,080 |
| Ultimate | 8,400 | 3,700 | 2,260 |
| Elongation (percent) | 20 | 54 | 98 |

Example 6

Prepared as in Example 2, using 10.0 g. (0.091 mol) of resorcinol and 6.9 g. (0.047 mol) of adipic acid in 75 cc. of pyridine. The copolymer softened at 40–50° C. and had an intrinsic viscosity of 0.20.

Example 7

Prepared as in Example 2, using 9.7 g. (0.048 mol) of 4,4'-dihydroxydiphenyl ether, and 4.6 g. (0.024 mol) of isophthalic acid in 75 cc. of pyridine. The copolymer had an intrinsic viscosity of 0.46 and a softening temperature of 145–160° C. It was only slightly soluble in dioxane or methylene chloride.

Example 8

Prepared as in Example 2, using 10.0 g. (0.092 mol) hydroquinone, and 6.9 g. (0.047 mol) adipic acid in 75 cc. of pyridine. The copolymer was insoluble in methylene chloride, tetrachloroethane, dioxane and benzene. It was swollen by pyridine, acetone and dimethylsulfoxide.

Example 9

Prepared as in Example 2, using 10.0 g. (0.040 mol) 4,4'-dihydroxydiphenyl sulfone and 2.9 g. (0.020 mol) adipic acid in 75 cc. of pyridine. The copolymer was soluble in methylene chloride and dioxane and had a softening temperature of 135–145° C.

Example 10

Example 3 was repeated using 0.046 mol of isophthalic acid. Properties were as follows.

Intrinsic viscosity _____ 0.82
Softening temperature (° C.) _____ 175–195
Tensile strength (p.s.i., 25° C.):
    Yield _____ 9,680
    Ultimate _____ 8,140
    Elongation (percent) _____ 80
Impact strength _____ 16.0
Flexural strength (p.s.i.) _____ 16,350
Stiffness (cm. kg./°) _____ 1.75
Heat distortion (° C.) _____ 163
Wt. loss (percent at 24 hrs., 230° C.) ____ 3.6
Transfer molding temperature (° C.) _____ 220–230

Example 11

Example 3 was again repeated using 0.137 mol of isophthalic acid. The properties of the copolymer were as follows.

Intrinsic viscosity _____ 0.56
Softening temperature _____ 200–220° C.
Tensile strength (25° C., p.s.i.):
    Yield _____ 8,720
    Ultimate _____ 7,910
    Elongation (percent) _____ 90
Impact strength _____ 1.0
Flexural strength (p.s.i.) _____ 17,900
Stiffness (cm.kg./°) _____ 1.75
Heat distortion (° C.) _____ 178
Wt. loss (percent at 24 hrs., 230° C.) ____ 2.3
Transfer molding temperature (° C.) _____ 230

Example 12

Example 5 was repeated using 0.046 mol of terephthalic acid. The properties of the resulting copolymer were as follows.

Softening temperature (° C.) _____ 185–205
Tensile strength (p.s.i., 25° C.):
    Yield _____ 9,080
    Ultimate _____ 9,310
    Elongation (percent) _____ 68

Examples 13 and 14 illustrate the preparation of copolymers using 3,6-endomethylene-Δ-4-tetrahydrophthalic acid, commerically known as "Nadic" acid as the difunctional acid. This acid has the structure

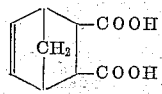

In each case copolymers were prepared as in Example 2 by bubbling phosgene into a pyridine solution of the acid and bisphenol-A.

Example 13

This example utilized a four to one molar ratio of bisphenol-A to Nadic acid. The properties of the copolymer were as follows.

Intrinsic viscosity _____ 0.57
Softening temperature (° C.) _____ 165–180
Tensile strength (p.s.i., 25° C.):
    Yield _____ 8,380
    Ultimate _____ 7,290
    Elongation (percent) _____ 44

Example 14

Example 13 was repeated using a two to one molar ratio of bisphenol-A to Nadic acid. The properties of the copolymer were as follows.

Softening temperature (° C.) _____ 175–195
Tensile strength (25°, p.s.i.)
    Ultimate _____ 9,730
    Elongation (percent) _____ 13

Example 15

This and the following example illustrates the preparation of a coplymer using a sulfur containing acid as the difunctional acid.

A copolymer was prepared as in Example 2 using a fifty to one molar ratio of bisphenol-A to acid. The acid used was thiodiglycollic acid having the structure

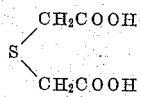

The intrinsic viscosity of the resulting copolymer was 0.78 and the softening temperature was 210–225° C.

Example 16

Example 15 was repeated using a four to one molar ratio of bisphenol-A to acid. The intrinsic viscosity of the copolymer was 0.37 and the softening temperature was 140–170° C.

Example 17

A copolymer was prepared as in Example 2 by bubbling phosgene into a pyridine solution of Empol 3079–S, as the acid, and bisphenol-A. Empol 3079–S is a linoleic acid dimer containing two carboxyl groups per molecule and having an approximate molecular weight of 570. The molar ratio of bisphenol-A to acid was ten to one.

The properties of the copolymer were as follows.

Intrinsic viscosity _____ 0.46
Softening temperature (° C.) _____ 115–125
Tensile strength (p.s.i., 25° C.)
    Yield _____ 9,750
    Elongation (percent) _____ 10

Examples 18 through 21 illustrate the preparation of block copolymers.

Example 18

Bisphenol-A, 0.17 mol (38.8 grams), and 0.17 mol (24.8 grams) of adipic acid were dissolved in 470 cc. of pyridine. About 25% of the theoretical amount of phosgene was bubbled into the solution. More bisphenol-A, 0.17 mol (38.8 grams), was then added with additional phosgene until a viscous end point was obtained. The polymer was precipitated and washed in the same manner as Example 1 and the following properties were obtained.

Intrinsic viscosity _____ 0.93
Softening temperature (° C.) _____ 105–145
Tensile strength (p.s.i.):

|  | 25° C. | 80° C. |
| --- | --- | --- |
| Ultimate | 8,300 | 5,280 |
| Elongation (Percent) | 6 | 5 |

Example 19

The same amounts of the same reactants were used as in Example 18 above. The procedure followed was likewise the same except that phosgene was added to the initial bisphenol-A-adipic acid solution until the solution was viscous. The remainder of the bisphenol-A was then added in 470 cc. of additional pyridine and phosgene again added to a viscous end point. The properties of the copolymer were as follows.

Intrinsic viscosity _____ 0.98
Tensile strength (p.s.i.):

|  | 25° C. | 80° C. |
| --- | --- | --- |
| Yield | 9,280 | 5,840 |
| Ultimate | 7,280 | 4,790 |
| Elongation (Percent) | 125 | 149 |

Example 20

Bisphenol-A, 0.17 mol (38.8 g.), was dissolved in 470 cc. pyridine and phosgene was bubbled into the stirred solution until viscous. Adipic acid, 0.085 mol (12.4 g.) was added in 470 cc. of pyridine and the addition of phosgene continued until very viscous. The polymer was precipitated and washed as above and had the following properties.

Intrinsic viscosity _____ 0.83
Softening temperature (° C.) _____ 155–175
Tensile strength (p.s.i.):

|  | 25° C. | 80° C. | 120° C. |
| --- | --- | --- | --- |
| Yield | 9,180 | 7,030 | 4,440 |
| Ultimate | 8,010 | 6,700 | 6,690 |
| Elongation (Percent) | 34 | 91 | 140 |

Example 21

In separate reaction vessels, phosgene was added to 0.17 mol each of bisphenol-A and adipic acid and to 0.17 mol of bisphenol-A, both in 470 cc. of pyridine solution. When both reaction mixtures had become viscous, the bisphenol-A reaction mixture was poured into the bisphenol-A-adipic acid mixture. After stirring for 15 minutes, a small amount of additional phosgene (0.3 gram/minute for two minutes) promoted a very viscous end point. The properties of the precipitated and washed copolymer were as follows.

Softening temperature (° C.) _____ 95–120
Tensile strength (25° C., p.s.i.):
    Ultimate _____ 8,980
    Elongation (percent) _____ 7
Tensile strength (80° C., p.s.i.):
    Yield _____ 3,010
    Ultimate _____ 3,580
    Elongation (percent) _____ 137

Examples 22 through 25 illustrate the preparation of copolymers using hydroxy acids.

Example 22

A 20 cc. solution of 10% by weight p-hydroxybenzoic acid in pyridine and an 80 cc. solution of 10% by weight bisphenol-A in pyridine were prepared and mixed. Phosgene was bubbled into the reaction mixture until a viscous end point was obtained. The cast film was clear and substantially water-white.

Tensile strength (p.s.i., 25° C.):
    Yield _____ 9,080
    Ultimate _____ 7,540
    Elongation (percent) _____ 67

Example 23

Example 22 was repeated using 30 cc. of the 10% p-hydroxybenzoic acid solution and 70 cc. of the 10% bisphenol-A solution. The resin had an intrinsic viscosity of 0.83. Films were clear, transparent and water-white and had the following properties.

Softening temperature (° C.) _____ 230–250
Tensile strength (p.s.i., 25° C.):
    Yield _____ 9,300
    Ultimate _____ 8,800
    Elongation (percent) _____ 64

*Example 24*

Example 22 was repeated using 10 cc. of the 10% p-hydroxybenzoic acid solution and 90 cc. of the 10% bisphenol-A solution. The copolymer had an intrinsic viscosity of 0.85 and a softening temperature of 210–240° C. Films cast from the copolymer had an ultimate tensile strength of 9500 p.s.i. at 25° C.

*Example 25*

A copolymer was prepared as in Example 22, using 37% by weight 3-hydroxy-2-naphthoic acid and 63% by weight bisphenol-A. The copolymer had an intrinsic viscosity of 0.40 and the film had an ultimate tensile strength at 25° C. of 7600 p.s.i.

It should be understood that, while throughout the specification, reference has been made to the use of difunctional acids, it is not intended to exclude the use of their anhydrides, acid halides, salts or esters for the preparation of the copolyesters.

The copolyesters of the present invention have a wide field of utility including structural, electrical and decorative applications.

The high temperature properties of the present copolyesters make them particularly adaptable for use as structural parts in dynamoelectric machines. The higher crystallinity obtainable with the present copolyesters makes possible their use as films or oriented films prepared by calendering or extrusion. The films can be used as metal or fiber liners, containers, covers, closures, electrical insulating tapes, sound recording tapes, or pipe coverings. They may also be used as fibers or oriented fibers for textile or industrial applications. Because of their chemical inertness and solvent resistance, tubings of these materials can be used to transport chemicals, such as acids and bases, which might be deleterious to other resins. Because of their chemical, physical and thermal properties, they may be used as surface coatings for such apparatus as refrigerators, washing machines, cooking ovens, etc. Additional uses are as rods, wire coating, wire enamels, adhesives and slot insulations in dynamoelectric machines. These resins can also be employed in varnish and paint formulations and as bonding material for metallic or fibrous laminates. The resins of the present invention may be mixed with various fillers, modifying agents such as dyes, pigments, stabilizers, plasticizers or antioxidants or they may be used as sizing and bonding agents for glass cloth, fibers or roving.

The foregoing detailed description has been given for clearness of understanding only and no unnecessary limitations are to be understood therefrom. The invention is not limited to the exact details shown and described, for obvious modifications will occur to those skilled in the art.

What I claim as new and desire to secure by Letters Patent of the United States is:

1. A high molecular weight, resinous, polymeric copolyester of a dihydric phenol, a dicarboxylic acid and carbonic acid.
2. A high molecular weight, resinous, polymeric copolyester of a dihydric phenol, an aromatic dicarboxylic acid and carbonic acid.
3. A high molecular weight, resinous, polymeric copolyester of a dihydric phenol containing two aromatic carbocyclic rings each of which contains a hydroxy group bonded to a ring carbon atom, an aromatic dicarboxylic acid, and carbonyl halide.
4. A high molecular weight, resinous, polymeric copolyester of a dihydric phenol containing two aromatic carbocyclic rings each of which contains a hydroxy group bonded to a ring carbon atom, a dicarboxylic acid and carbonyl halide.
5. A high molecular weight, resinous, polymeric copolyester of 2,2-bis-(4-hydroxyphenyl)-propane, a dicarboxylic acid, and phosgene.
6. A high molecular weight, resinous, polymeric copolyester of a dihydric phenol, a difunctional carboxylic acid selected from the group consisting of a dicarboxylic acid and a monohydroxy monocarboxylic acid, and carbonic acid.
7. The copolyester of claim 6 of a mixture of difunctional carboxylic acids.
8. The copolyester of claim 6 of a mixture of the dihydric phenols.
9. The copolyester of claim 6 in which the difunctional carboxylic acid is isophthalic acid.
10. The copolyester of claim 6 in which the difunctional carboxylic acid is adipic acid.
11. The copolyester of claim 6 in which the difunctional carboxylic acid is terephthalic acid.
12. The copolyester of claim 6 in which the difunctional carboxylic acid is azelaic acid.
13. The copolyester of claim 6 in which the difunctional carboxylic acid is endomethylenetetrahydrophthalic acid.
14. The copolyester of claim 6 in which the difunctional carboxylic acid is an hydroxy carboxylic acid.
15. The copolyester of claim 6 in which the dihydric phenol is 2,2-bis-(4-hydroxyphenyl)-propane.
16. The copolyester of claim 6 in which the dihydric phenol is 4,4'-dihydroxydiphenyl ether.
17. The copolyester of claim 6 in which the dihydric phenol is 4,4'-dihydroxydiphenyl sulfone.
18. The high molecular weight resinous polymeric copolyester of a dihydric phenol, a difunctional carboxylic acid selected from a group consisting of a dicarboxylic acid and a monohydroxy monocarboxylic acid, and phosgene.

References Cited by the Examiner

UNITED STATES PATENTS

| | | | |
|---|---|---|---|
| 2,762,789 | 9/56 | Fisher | 260—47 |
| 2,799,665 | 7/57 | Lincoln | 260—47 |
| 2,808,390 | 10/57 | Caldwell | 260—75 |

OTHER REFERENCES

Schnell: Ang. Chem., 68, 633–640 (October 1956).

WILLIAM H. SHORT, *Primary Examiner.*

H. N. BURSTEIN, P. E. MANGAN, *Examiners.*